(12) United States Patent
Wei et al.

(10) Patent No.: US 12,541,868 B2
(45) Date of Patent: Feb. 3, 2026

(54) IMAGE REGISTRATION METHOD AND APPARATUS, ELECTRONIC APPARATUS, AND STORAGE MEDIUM

(71) Applicant: INSPUR SUZHOU INTELLIGENT TECHNOLOGY CO., LTD., Jiangsu (CN)

(72) Inventors: Hui Wei, Jiangsu (CN); Ruyang Li, Jiangsu (CN); Yaqian Zhao, Jiangsu (CN); Xingchen Cui, Jiangsu (CN); Rengang Li, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 456 days.

(21) Appl. No.: 18/012,584

(22) PCT Filed: Jun. 30, 2021

(86) PCT No.: PCT/CN2021/103359
§ 371 (c)(1),
(2) Date: Dec. 22, 2022

(87) PCT Pub. No.: WO2022/052582
PCT Pub. Date: Mar. 17, 2022

(65) Prior Publication Data
US 2023/0252664 A1    Aug. 10, 2023

(30) Foreign Application Priority Data
Sep. 8, 2020   (CN) .......................... 202010934767.7

(51) Int. Cl.
*G06T 7/593*    (2017.01)
*G06T 7/33*     (2017.01)
*G06T 7/564*    (2017.01)

(52) U.S. Cl.
CPC .............. *G06T 7/593* (2017.01); *G06T 7/33* (2017.01); *G06T 7/564* (2017.01); *G06T 2207/10012* (2013.01)

(58) Field of Classification Search
CPC ........... G06T 7/593; G06T 7/33; G06T 7/564; G06T 2207/10012; G06T 7/13; G06T 7/55; G06T 2207/20228
See application file for complete search history.

(56) References Cited

U.S. PATENT DOCUMENTS

| 2013/0083994 A1 | 4/2013 | Ren et al. |
| 2018/0150723 A1* | 5/2018 | Kim ........................ G06T 7/593 |

FOREIGN PATENT DOCUMENTS

| CN | 105160702 A | 12/2015 |
| CN | 106529495 A | 3/2017 |

(Continued)

OTHER PUBLICATIONS

International Search report for PCT/CN2021/103359 mailed on Sep. 26, 2021.

(Continued)

*Primary Examiner* — Chan S Park
*Assistant Examiner* — Daniel C Chang
(74) *Attorney, Agent, or Firm* — Dennemeyer & Associates LLC

(57) ABSTRACT

An image registration method and apparatus, an electronic apparatus, and a storage medium are provided. The image registration method comprises: extracting edge pixels of the binocular image, and determining high-confidence parallax points in the edge pixels and parallax; projecting each non-high-confidence parallax point to the triangular mesh in a direction parallel with a parallax dimension to obtain a triangular face; determining a parallax search range of parallax of each non-high-confidence parallax point, calculating a matching cost corresponding to all parallax in each parallax search range, and determining that parallax with the smallest matching cost is the parallax of the corresponding non-high-confidence parallax point; and determining a depth boundary point in the edge pixels, determining a parallax boundary point of each depth boundary point in a target direction, and setting parallax of pixels between the depth boundary point and the parallax boundary point to a target value.

16 Claims, 4 Drawing Sheets

(56) References Cited

FOREIGN PATENT DOCUMENTS

| CN | 108122250 A | 6/2018 |
| CN | 108564604 A | 9/2018 |
| CN | 109191512 A | 1/2019 |
| CN | 111210468 A | 5/2020 |
| CN | 112116639 A | 12/2020 |
| JP | 2014096062 A | 5/2014 |

OTHER PUBLICATIONS

Search report for Chinese application No. 202010934767.7 filed Sep. 8, 2020.
Radouane Ait-Jellal et al., "LS-ELAS: Line segment based efficient large scale stereo matching", 2017 IEEE International Conference on Robotics and Automation (ICRA),Jul. 24, 2017 (Jul. 24, 2017), pp. 2-3 section III.
Andreas Geiger et al., "Efficient large-scale stereo matching", ResearchGate, May 28, 2014 (May 28, 2014), pp. 4-8 section 3, figure 2.

* cited by examiner

Fig. 1

A binocular image is acquired, edge pixels of the binocular image are extracted, and high-confidence parallax points in the edge pixels and parallax of each of the high-confidence parallax points are determined — S101

Triangulation is performed on all of the high-confidence parallax points on the basis of a three-dimensional space defined by pixel coordinates and the parallax of each of the high-confidence parallax points to obtain a triangular mesh, and each non-high-confidence parallax point is projected to the triangular mesh in a direction parallel with a parallax dimension to obtain a triangular face — S102

It is determined that a range defined by a greatest parallax value and a smallest parallax value of three vertices in each of the triangular faces is a parallax search range of parallax of each of the non-high-confidence parallax points, a matching cost corresponding to all parallax in each of the parallax search ranges is calculated, and it is determined that parallax with the smallest matching cost is the parallax of the corresponding non-high-confidence parallax point — S103

A depth boundary point is determined in the edge pixels according to distribution of the high-confidence parallax points, a parallax boundary point of each depth boundary point in a target direction is determined, and parallax of pixels between the depth boundary point and the parallax boundary point is set to a target value — S104

Fig. 2

A gradient value of each pixel in the binocular image is calculated so as to obtain a gradient image corresponding to the binocular image, and a filtering operation is performed on the gradient image ~S201

Non-maximum suppression is performed on the gradient image after the filtering operation so as to determine the edge pixels ~S202

A preset pixel range neighborhood search in a horizontal direction and a vertical direction is performed on all of the edge pixels, if the edge pixel exists in the preset pixel range neighborhood and a directly adjacent position is a non-edge pixel, the directly adjacent position is set to the edge pixel so as to determine all edge pixels corresponding to the binocular image ~S203

IMAGE REGISTRATION METHOD AND APPARATUS, ELECTRONIC APPARATUS, AND STORAGE MEDIUM

CROSS-REFERENCE TO RELATED APPLICATIONS

This is a 35 U.S.C. 371 National Stage Patent Application of International Application No. PCT/CN2021/103359, filed Jun. 30, 2021, which claims priority to Chinese application 202010934767.7, filed Sep. 8, 2020, each of which is hereby incorporated by reference in its entirety.

TECHNICAL FIELD

The present disclosure relates to the technical field of image matching, and in particular to an image registration method and apparatus, an electronic apparatus, and a computer-readable storage medium.

BACKGROUND

Binocular stereo vision is a basic principle capable of imitating human eyes to form 3D vision using a bionic principle, takes images with two cameras at a certain distance, searches corresponding matching points in the two images, calculates pixel parallax between the matching points, and then calculates the depth of a scene point from the camera through a triangulation principle.

Image matching may be divided into a global method and a local method as a whole. The parallax precision obtained by the global method is very high, but the global optimization process involves the design of multiple parameters, and the solving process faces complex and unstable problems, so that the calculation efficiency does not meet the requirements for online disclosure. The local method assumes that all pixels in a neighborhood window have the same parallax value, which will cause smooth and blurred parallax results, the problems such as boundary overflow, and the difficulty in obtaining the precise depth boundary. The local method is less precise than the global method, but very high in calculation efficiency. Combining the advantages of the global method and the local method, a Semi-Global Matching (SGM) method and the like appear. The Semi-Global Matching (SGM) method not only performs matching cost calculation on the basis of the window, but also calculates the global matching cost in multiple sampling directions. By combining the local cost and the global cost, the precision of parallax calculation results is improved, and the calculation efficiency is between the local method and the global method. Due to the sampling optimization in a global direction, the parallax result has the problems such as stripe aliasing and the boundary burr, which leads to relatively low image matching precision.

Therefore, how to improve matching precision of binocular images is a problem to be solved by those skilled in the art.

SUMMARY

The present disclosure aims at providing an image registration method and apparatus, an electronic apparatus, and a computer-readable storage medium, which may improve matching precision of binocular images.

In order to achieve the above object, the present disclosure provides the image registration method, which may include the following operations.

A binocular image is acquired, edge pixels of the binocular image are extracted, and high-confidence parallax points in the edge pixels and parallax of each of the high-confidence parallax points are determined.

Triangulation is performed on all of the high-confidence parallax points on the basis of a three-dimensional space defined by pixel coordinates and the parallax of each of the high-confidence parallax points to obtain a triangular mesh, and each non-high-confidence parallax point is projected to the triangular mesh in a direction parallel with a parallax dimension to obtain a triangular face.

It is determined that a range defined by a greatest parallax value and a smallest parallax value of three vertices in each of the triangular faces is a parallax search range of parallax of each of the non-high-confidence parallax points, a matching cost corresponding to all parallax in each of the parallax search ranges is calculated, and it is determined that parallax with the smallest matching cost is the parallax of the corresponding non-high-confidence parallax point.

A depth boundary point is determined in the edge pixels according to distribution of the high-confidence parallax points, a parallax boundary point of each depth boundary point in a target direction is determined, and parallax of pixels between the depth boundary point and the parallax boundary point is set to a target value. Wherein, the target value is a value close to a parallax value of the depth boundary point in a first parallax value and a second parallax value, the first parallax value is a parallax value of a first pixel point, the second parallax value is a parallax value of a second pixel point, the first pixel point and the second pixel point are adjacent pixel points, and the parallax boundary point is located between the first pixel point and the second pixel point.

Wherein, the operation that the edge pixels of the binocular image are extracted may include the following operations.

A gradient value of each pixel in the binocular image is calculated so as to obtain a gradient image corresponding to the binocular image, and a filtering operation is performed on the gradient image.

Non-maximum suppression is performed on the gradient image after the filtering operation so as to determine the edge pixels.

A preset pixel range neighborhood search in a horizontal direction and a vertical direction is performed on all of the edge pixels, when the edge pixel exists in the preset pixel range neighborhood and a directly adjacent position is a non-edge pixel, the directly adjacent position is set to the edge pixel so as to determine all edge pixels corresponding to the binocular image.

Wherein, the operation that the filtering operation is performed on the gradient image may include the following operations.

Each of the gradient values is compared with all gradient values in a preset neighborhood range.

A position gradient value with the same magnitude and different direction from the gradient value in the preset neighborhood range is set to 0.

Wherein, the operation that non-maximum suppression is performed on the gradient image after the filtering operation so as to determine the edge pixels may include the following operations.

Each target gradient value after the filtering operation is compared with all gradient values in the preset neighborhood range.

It is determined that a pixel corresponding to a target gradient value which is greater than all gradient values in the preset neighborhood range is the edge pixel.

Wherein, the operation that the high-confidence parallax points in the edge pixels and parallax of each of the high-confidence parallax points are determined may include the following operations.

A feature vector of each pixel in the binocular image is extracted, and matching cost calculation is performed on feature vectors of all pixels in a neighborhood window in a preset parallax search range of all of the edge pixels.

It is determined that an edge pixel of which the matching cost satisfies a preset condition is the high-confidence parallax point. Wherein, the preset condition may include that the smallest matching cost is less than a first preset value and the ratio of the smallest matching cost to the second smallest matching cost is less than a second preset value.

It is determined that the parallax of the smallest matching cost is the parallax of the high-confidence parallax point.

Wherein, the operation that the depth boundary point is determined in the edge pixels according to distribution of the high-confidence parallax points may include the following operations.

Whether the number of high-confidence parallax points is greater than a third preset value is determined in a first preset search range for each of the edge pixels.

When the number of high-confidence parallax points is greater than a third preset value in a first preset search range for each of the edge pixels, statistical values of the parallax of all high-confidence parallax points in the first preset search range are calculated. Wherein, the statistical values may include a mean square error.

It is determined that an edge pixel corresponding to the statistical value greater than the third preset value is the depth boundary point.

Wherein, the operation that the parallax boundary point of each depth boundary point in the target direction is determined may include the following operations.

A second preset search range search is performed on each of the depth boundary points in the target direction, and a parallax difference between every two adjacent pixel points is determined.

It is determined that adjacent pixel points corresponding to a parallax difference greater than a fourth preset value are the first pixel point and the second pixel point.

It is determined that an intermediate position of the first pixel point and the second pixel point is the parallax boundary point.

In order to achieve the above object, the present disclosure provides an image registration apparatus, which may include: a first determination module, a projection module, a second determination module, and an adjustment module.

The first determination module may be configured to acquire the binocular image, extract edge pixels of the binocular image, and determine high-confidence parallax points in the edge pixels and parallax of each of the high-confidence parallax points.

The projection module may be configured to perform triangulation on all of the high-confidence parallax points on the basis of the three-dimensional space defined by pixel coordinates and the parallax of each of the high-confidence parallax points to obtain the triangular mesh, and project each non-high-confidence parallax point to the triangular mesh in the direction parallel with the parallax dimension to obtain the triangular face.

The second determination module may be configured to determine that a range defined by the greatest parallax value and the smallest parallax value of three vertices in each of the triangular faces is the parallax search range of parallax of each of the non-high-confidence parallax points, calculate the matching cost corresponding to all parallax in each of the parallax search ranges, and determine that parallax with the smallest matching cost is the parallax of the corresponding non-high-confidence parallax point.

The adjustment module may be configured to determine the depth boundary point in the edge pixels according to distribution of the high-confidence parallax points, determine the parallax boundary point of each depth boundary point in the target direction, and set parallax of pixels between the depth boundary point and the parallax boundary point to the target value. Wherein, the target value is a value close to a parallax value of the depth boundary point in the first parallax value and the second parallax value, the first parallax value is a parallax value of the first pixel point, the second parallax value is a parallax value of the second pixel point, the first pixel point and the second pixel point are adjacent pixel points, and the parallax boundary point is located between the first pixel point and the second pixel point.

In order to achieve the above object, the present disclosure provides the electronic apparatus, which may include a memory and a processor.

The memory may be configured to store computer programs.

The processor may be configured to implement steps of the above image registration method when executing the computer programs.

In order to achieve the above object, the present disclosure provides the computer-readable storage medium, on which a computer program is stored. When executed by a processor, the computer program implements steps of the above image registration method.

From the above solutions, the image registration method provided by the present disclosure includes that: the binocular image is acquired, the edge pixels of the binocular image are extracted, and the high-confidence parallax points in the edge pixels and parallax of each of the high-confidence parallax points are determined; triangulation is performed on all of the high-confidence parallax points on the basis of the three-dimensional space defined by the pixel coordinates and the parallax of each of the high-confidence parallax points to obtain the triangular mesh, and each non-high-confidence parallax point is projected to the triangular mesh in a direction parallel with a parallax dimension to obtain the triangular face; it is determined that the range defined by the greatest parallax value and the smallest parallax value of three vertices in each of the triangular faces is the parallax search range of the parallax of each of the non-high-confidence parallax points, the matching cost corresponding to all parallax in each of the parallax search ranges is calculated, and it is determined that the parallax with the smallest matching cost is the parallax of the corresponding non-high-confidence parallax point; and the depth boundary point is determined in the edge pixels according to distribution of the high-confidence parallax points, the parallax boundary point of each depth boundary point in the target direction is determined, and the parallax of the pixels between the depth boundary point and the parallax boundary point is set to the target value. Wherein, the target value is the value close to the parallax value of the depth boundary point in the first parallax value and the second parallax value, the first parallax value is the parallax value of the first pixel point, the second parallax value is the parallax value of the second pixel point, the first pixel point and the second pixel point are adjacent pixel points, and the parallax boundary point is located between the first pixel point and the second pixel point.

In the image matching method provided by the present disclosure, the idea of step-by-step matching is proposed. Firstly, a relatively precise parallax value is obtained by matching a high-confidence parallax point with obvious features, and then the high-confidence parallax point is used as a guide to quickly match a non-high-confidence parallax point, namely, the parallax value of the non-high-confidence parallax point is determined. Secondly, by extracting the depth boundary of the image, the depth boundary which may exactly correspond to the edge position of an object is extracted, and then a parallax boundary optimization method on the basis the depth boundary is proposed. Taking the depth boundary as the reference, the boundary position in a dense parallax result is determined by searching in a certain neighborhood range in a specific direction, and then the parallax boundary is aligned with the depth boundary through pixel filling. Finally, a binocular image matching result with the precise parallax boundary may be obtained. Therefore, the image matching method provided by the present disclosure improves matching precision of the binocular images. The present disclosure also discloses the image registration apparatus, the electronic apparatus, and the computer-readable storage medium, which may also achieve the above technical effects.

It is to be understood that the above general description and the following detailed description are only exemplary and not intended to limit the present disclosure.

BRIEF DESCRIPTION OF THE DRAWINGS

In order to more clearly illustrate the embodiments of the present disclosure or the embodiment in the related art, the drawings used in the description of the embodiments or the related art will be briefly described below. It is apparent that the drawings described below are only some embodiments of the present disclosure. Other drawings may further be obtained by those of ordinary skill in the art according to these drawings without creative efforts. The drawings are used to provide a further understanding of the present disclosure, constitute a part of the specification, and used to explain the present disclosure together with the following specific implementation mode, but not to limit the present disclosure. In the drawings.

FIG. 1 is a flow diagram of the image registration method shown according to an exemplary embodiment.

FIG. 2 is a flow diagram of another image registration method shown according to an exemplary embodiment.

DETAILED DESCRIPTION OF THE EMBODIMENTS

Figure 3:
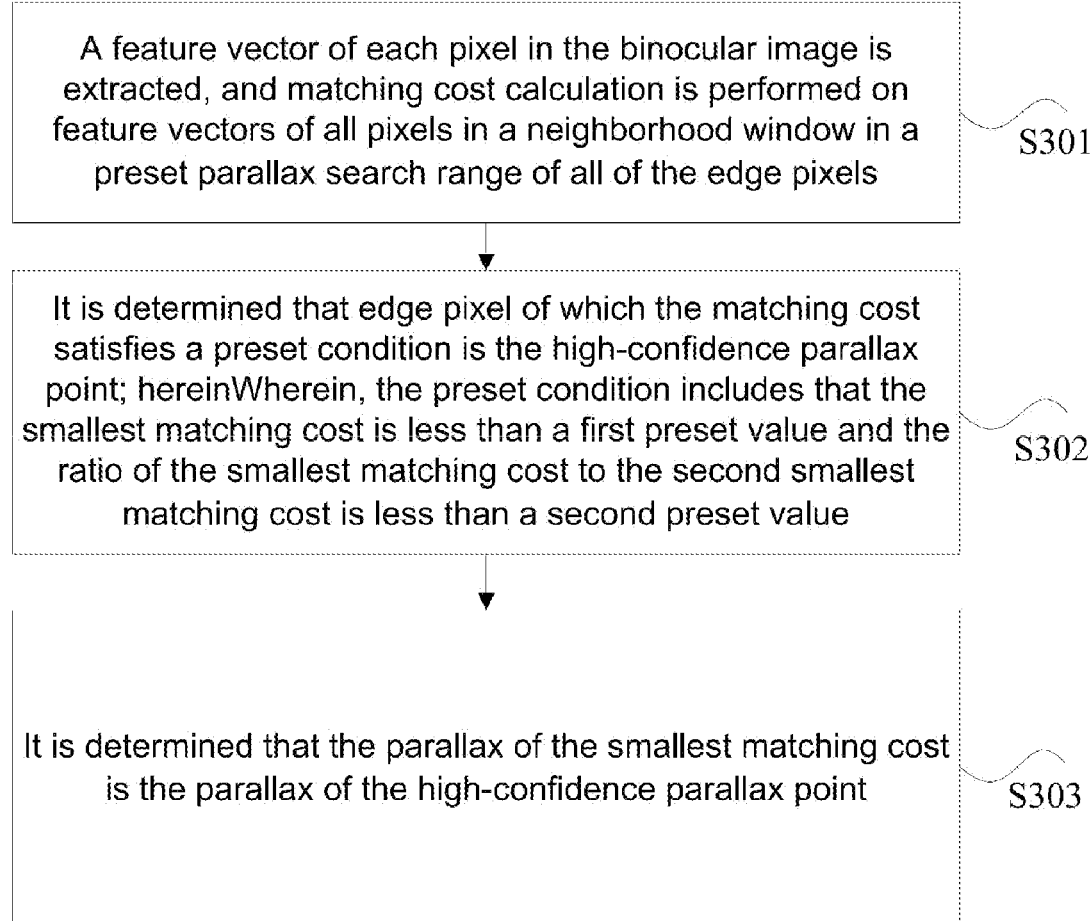
FIG. 3 is a flow diagram of yet another image registration method shown according to an exemplary embodiment.

The methods in the embodiments of the present disclosure will be clearly and completely described in conjunction with the drawings in the embodiments of the present disclosure. It is apparent that the described embodiments are only a part of the embodiments of the present disclosure, and not all of them. All other embodiments obtained by those of ordinary skill in the art on the basis the embodiments of the present disclosure without creative efforts are within the scope of the present disclosure. In addition, "first", "second" and the like in the embodiments of the present disclosure are used to distinguish similar objects, and are not necessarily used to describe a specific order or sequence.

The embodiments of the present disclosure disclose the image registration method, which improves matching precision of binocular images.

Referring to FIG. 1, a flow diagram of the image registration method shown according to an exemplary embodiment, as shown in FIG. 1, includes the following operations.

At step S101, a binocular image is acquired, edge pixels of the binocular image are extracted, and high-confidence parallax points in the edge pixels and parallax of each of the high-confidence parallax points are determined.

In the embodiment, the binocular images are two images taken by two cameras separated by a certain distance. In specific implementation, the edge pixels of the binocular image are extracted, and the high-confidence parallax points in the edge pixels are determined. It is to be noted that all pixels in the binocular image are divided into the high-confidence parallax points and non-high-confidence parallax points, and the parallax of the high-confidence parallax points is first determined according to a local matching algorithm in the step S101.

At step S102, triangulation is performed on all of the high-confidence parallax points on the basis of a three-dimensional space defined by pixel coordinates and the parallax of each of the high-confidence parallax points to obtain a triangular mesh, and each non-high-confidence parallax point is projected to the triangular mesh in a direction parallel with a parallax dimension to obtain a triangular face.

At step S103, it is determined that a range defined by a greatest parallax value and a smallest parallax value of three vertices in each of the triangular faces is a parallax search range of parallax of each of the non-high-confidence parallax points, a matching cost corresponding to all parallax in each of the parallax search ranges is calculated, and it is determined that parallax with the smallest matching cost is the parallax of the corresponding non-high-confidence parallax point.

In specific implementation, for each high-confidence parallax point, Delaunay triangulation is performed in the three-dimensional space defined by pixel coordinates and corresponding parallax thereof to obtain the triangular mesh. For any pixel with the non-high-confidence parallax point, a projection is made to the triangular mesh in the direction parallel with the parallax dimension to obtain a specific triangular face corresponding thereto. The smallest parallax value and the greatest parallax value of the three vertices of the triangular face are calculated to form the parallax range, and the parallax range is used as the parallax search range of the current pixel matching calculation. According to the calculation process of the local matching algorithm, the matching costs corresponding to all parallax are calculated in the parallax search range, and the parallax corresponding to the minimum cost is selected as the parallax value of the current pixel.

At step S104, a depth boundary point is determined in the edge pixels according to distribution of the high-confidence parallax points, a parallax boundary point of each depth boundary point in a target direction is determined, and parallax of pixels between the depth boundary point and the parallax boundary point is set to a target value.

Wherein, the target value is a value close to a parallax value of the depth boundary point in a first parallax value and a second parallax value, the first parallax value is a parallax value of a first pixel point, the second parallax value is a parallax value of a second pixel point, the first pixel point and the second pixel point are adjacent pixel points, and the parallax boundary point is located between the first pixel point and the second pixel point.

The step S104 aims at determining the depth boundary point of the binocular image, so as to align the parallax boundary on the basis of the depth boundary. As a feasible implementation mode, the operation that the depth boundary point is determined in the edge pixels according to distribution of the high-confidence parallax points includes that: whether the number of high-confidence parallax points is greater than a third preset value is determined in a first preset search range for each of the edge pixels; and when the number of high-confidence parallax points is greater than a third preset value in a first preset search range for each of the edge pixels, statistical values of the parallax of all high-confidence parallax points in the first preset search range are calculated. Wherein, the statistical values may include a mean square error. It is determined that an edge pixel corresponding to the statistical value greater than the third preset value is the depth boundary point.

In specific implementation, for each texture edge pixel, whether the high-confidence parallax point exists is searched in the range of a search window of a given size. When none or the number is less than a given threshold, the texture edge pixel is not the depth boundary; and when the high-confidence parallax point exists is searched in the range of the search window of the given size, parallax distribution assessment of the high-confidence parallax points is performed. As a feasible implementation mode, the mean square error of all of the confidence parallax in the range of the search window is calculated, and other metrics such as an absolute value of a difference between the greatest parallax and the smallest parallax may also be selected, and are not specifically limited herein. For depth boundary determination, when the mean square error is greater than a given threshold, it is determined that the current texture edge pixel is the depth boundary point, otherwise the current texture edge pixel is not the depth boundary point.

After determining the depth boundary points, the parallax boundary point of each depth boundary point in the target direction is determined, and the target direction here includes a horizontal positive direction, a horizontal negative direction, a vertical positive direction, and a vertical negative direction. As a feasible implementation mode, the operation that the parallax boundary point of each depth boundary point in the target direction is determined includes that: a second preset search range search is performed on each of the depth boundary points in the target direction, and a parallax difference between every two adjacent pixel points is determined; it is determined that adjacent pixel points corresponding to a parallax difference greater than a fourth preset value are the first pixel point and the second pixel point; and it is determined that an intermediate position of the first pixel point and the second pixel point is the parallax boundary point.

In specific implementation, taking the search in the horizontal direction as an example, for any depth boundary point D, a search is performed in a range of a given size in the horizontal positive (or negative) direction, and the parallax difference between two adjacent pixels is determined. When the absolute value of the parallax difference between adjacent pixels A and B is greater than a given threshold, the position between the two pixels is considered as the parallax boundary point, and the search process in the negative (or positive) direction is not performed at the same time. All pixel parallax between the current depth boundary point and the parallax boundary is set to the parallax of the one of A and B close to D. When the absolute value of the parallax difference between the adjacent pixels is not greater than the given threshold, a search in the negative (or positive) direction is performed, so as to perform parallax boundary point and parallax adjustment. The search in the vertical direction is similar to the search in the horizontal direction, which will not be repeated here.

It can be seen that, in the present disclosure, a high-fidelity and high-efficiency binocular image matching method is designed for the problems of precise parallax boundary maintenance and calculation efficiency on the basis of a high-resolution image during the binocular image matching process. A high-efficiency matching method for the high-resolution image is designed for the problem of time consumption of the matching calculation process. Firstly, robust feature points with obvious features are matched with high confidence to obtain relatively precise sparse parallax. Then, the sparse parallax is used as a guide to quickly match the remaining pixels to obtain a dense parallax result. An image depth boundary recognition method is designed. Firstly, a fine texture boundary of the image is extracted, the depth boundary is recognized in the texture boundary in combination with a sparse parallax value of the image, and the depth boundary which may exactly correspond to the edge position of an object is extracted. A parallax boundary optimization method on the basis of the depth boundary is proposed. The depth boundary is used as the reference, the boundary position in the dense parallax result is determined by searching in a certain neighborhood range in a specific direction, and then the parallax boundary is aligned with the depth boundary through pixel filling.

In the image matching method provided by the embodiments of the present disclosure, the idea of step-by-step matching is proposed. Firstly, a relatively precise parallax value is obtained by matching a high-confidence parallax point with obvious features, and then the high-confidence parallax point is used as a guide to quickly match a non-high-confidence parallax point, namely, the parallax value of the non-high-confidence parallax point is determined. Secondly, by extracting the depth boundary of the image, the depth boundary which may exactly correspond to the edge position of an object is extracted, and then a parallax boundary optimization method on the basis the depth boundary is proposed. Taking the depth boundary as the reference, the boundary position in the dense parallax result is determined by searching in a certain neighborhood range in a specific direction, and then the parallax boundary is aligned with the depth boundary through pixel filling. Finally, a binocular image matching result with the precise parallax boundary may be obtained. Therefore, the image matching method provided by the embodiments of the present disclosure improves matching precision of the binocular images.

A specific method for determining the edge pixels is specifically described below.

Referring to FIG. 2, a flow diagram of another image registration method shown according to an exemplary embodiment, as shown in FIG. 2, includes the following operations.

At step S201, a gradient value of each pixel in the binocular image is calculated so as to obtain a gradient image corresponding to the binocular image, and a filtering operation is performed on the gradient image.

In the step S201, firstly, for each pixel in the binocular image, the absolute values of the pixel gray differences between the pixel and the surrounding 8 neighborhoods are calculated respectively, the maximum value thereof is used as the gradient value of the current pixel, and the direction thereof is recorded to obtain the gradient image.

Secondly, the gradient image is filtered and non-isotropic repeated gradient values are merged. As a feasible implementation mode, the operation that the filtering operation is performed on the gradient image includes that: each of the gradient values is compared with all gradient values in the preset neighborhood range; and the position gradient value with the same magnitude and different direction from the gradient value in the preset neighborhood range is set to 0. In specific implementation, whether the magnitude and the directions of the gradient values in the surrounding 8 neighborhoods are the same as each gradient value is compared, and all position gradient values with the same magnitude and different directions from each gradient value are set to 0 to obtain an image after gradient filtering.

At step S202, non-maximum suppression is performed on the gradient image after the filtering operation so as to determine the edge pixels.

In the step S202, non-maximum suppression is performed on the image after gradient filtering. As a feasible implementation mode, the operation that non-maximum suppression is performed on the gradient image after the filtering operation so as to determine the edge pixels includes that: each target gradient value after the filtering operation is compared with all gradient values in the preset neighborhood range; and it is determined that a pixel corresponding to the target gradient value which is greater than all gradient values in the preset neighborhood range is the edge pixel.

In specific implementation, each pixel of the image after gradient filtering is compared with the magnitude of the gradient values of all pixels in the surrounding 8 neighborhoods, and when the gradient of the pixel is greater than or equal to the gradient of all pixels in the surrounding 8 neighborhoods, the pixel is used as the edge pixel.

At step S203, the preset pixel range neighborhood search in the horizontal direction and the vertical direction is performed on all of the edge pixels, when the edge pixel exists in the preset pixel range neighborhood and the directly adjacent position is the non-edge pixel, the directly adjacent position is set to the edge pixel so as to determine all edge pixels corresponding to the binocular image.

In the step S203, a 2-pixel range neighborhood search in the horizontal direction and the vertical direction is respectively performed on all edge pixels, when the edge pixel exists in the 2-pixel range neighborhood in a certain direction and the directly adjacent position is not the edge pixel, the adjacent position pixel is set to the edge pixel, and finally a complete edge of the image is obtained.

A specific method for determining the parallax of the high-confidence parallax point is specifically described below.

Referring to FIG. 3, a flow diagram of yet another image registration method shown according to an exemplary embodiment, as shown in FIG. 3, includes the following operations.

At step S301, a feature vector of each pixel in the binocular image is extracted, and matching cost calculation is performed on feature vectors of all pixels in a neighborhood window in a preset parallax search range of all of the edge pixels.

In the step S301, Sobel feature responses of all pixels in the neighborhood window around each pixel in the binocular image in the horizontal direction and the vertical direction are calculated. For each pixel, multiple feature response values are selected from the calculated Sobel feature responses of all pixels in the neighborhood window around the pixel according to a certain specified rule to constitute a feature vector as a feature description of the pixel. For all image edge pixels, according to the local matching algorithm, matching cost calculation is performed on the features of all pixels in the neighborhood window in a given parallax search range.

At step S302, it is determined that an edge pixel of which the matching cost satisfies a preset condition is the high-confidence parallax point. Wherein, the preset condition includes that the smallest matching cost is less than a first preset value and the ratio of the smallest matching cost to the second smallest matching cost is less than a second preset value.

At step S303, it is determined that the parallax of the smallest matching cost is the parallax of the high-confidence parallax point.

In specific implementation, for a certain pixel, when the minimum value of all calculated parallax matching costs is greater than a certain given threshold, the pixel is not high-confidence matching, otherwise the minimum value and the second minimum value of all calculated parallax matching costs are selected, the ratio of the minimum value and the second minimum value is calculated, and when the ratio is less than a certain given threshold, the matching cost corresponding to the minimum value is used as the matching cost of the corresponding pixel and the corresponding parallax value is used as the parallax of the pixel, otherwise the pixel is not high-confidence matching.

An image registration apparatus provided by the embodiments of the present disclosure is described below, and the image registration apparatus described below and the image registration method described above may be referred to each other.

Figure 4:
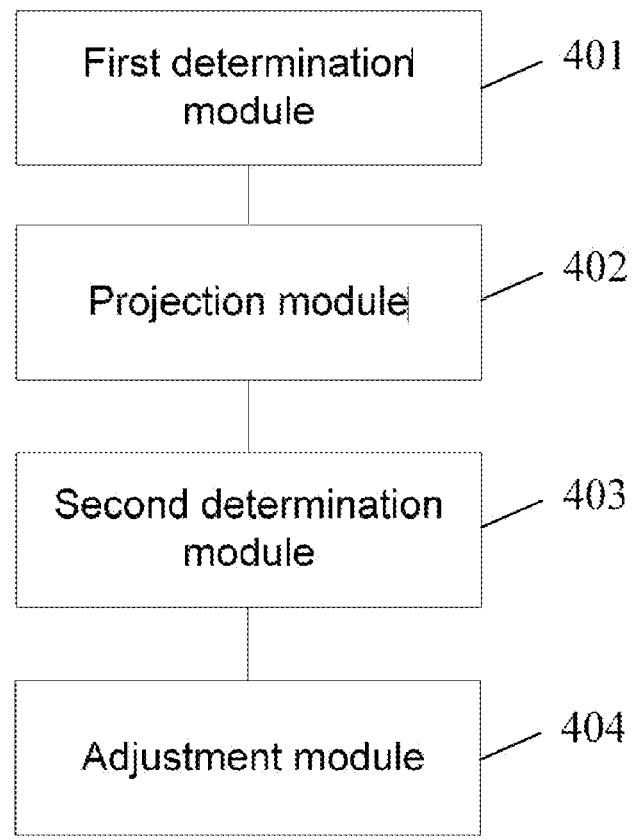
FIG. 4 is a structural diagram of the image registration apparatus shown according to an exemplary embodiment.

Referring to FIG. 4, a structural diagram of the image registration apparatus shown according to an exemplary embodiment, as shown in FIG. 4, includes: a first determination module 401, a projection module 402, a second determination module 403, and an adjustment module 404.

The first determination module 401 is configured to acquire a binocular image, extract edge pixels of the binocular image, and determine high-confidence parallax points in the edge pixels and parallax of each of the high-confidence parallax points.

The projection module 402 is configured to perform triangulation on all of the high-confidence parallax points on the basis of a three-dimensional space defined by pixel coordinates and the parallax of each of the high-confidence parallax points to obtain a triangular mesh, and project each non-high-confidence parallax point to the triangular mesh in a direction parallel with a parallax dimension to obtain a triangular face.

The second determination module 403 is configured to determine that a range defined by a greatest parallax value and a smallest parallax value of three vertices in each of the triangular faces is a parallax search range of parallax of each of the non-high-confidence parallax points, calculate a matching cost corresponding to all parallax in each of the parallax search ranges, and determine that parallax with the smallest matching cost is the parallax of the corresponding non-high-confidence parallax point.

The adjustment module 404 is configured to determine a depth boundary point in the edge pixels according to distribution of the high-confidence parallax points, determine a parallax boundary point of each depth boundary point in a target direction, and set parallax of pixels between the depth boundary point and the parallax boundary point to a target value. Wherein, the target value is a value close to a parallax value of the depth boundary point in a first parallax value and a second parallax value, the first parallax value is a parallax value of a first pixel point, the second parallax value is a parallax value of a second pixel point, the first pixel point and the second pixel point are adjacent pixel points, and the parallax boundary point is located between the first pixel point and the second pixel point.

In the image matching apparatus provided by the embodiments of the present disclosure, the idea of step-by-step matching is proposed. Firstly, the relatively precise parallax value is obtained by matching the high-confidence parallax point with obvious features, and then the high-confidence parallax point is used as the guide to quickly match the non-high-confidence parallax point, namely, the parallax value of the non-high-confidence parallax point is determined. Secondly, by extracting the depth boundary of the image, the depth boundary which may exactly correspond to the edge position of an object is extracted, and then the parallax boundary optimization method on the basis the depth boundary is proposed. The depth boundary is used as the reference, the boundary position in the dense parallax result is determined by searching in the certain neighborhood range in the specific direction, and then the parallax boundary is aligned with the depth boundary through pixel filling. Finally, the binocular image matching result with the precise parallax boundary may be obtained. It can be seen that the image matching apparatus provided by the embodiments of the present disclosure improves matching precision of the binocular images.

On the basis of the above embodiments, as a preferred implementation mode, the first determination module 401 includes: an acquisition unit, a first calculation unit, a first determination unit, and a second determination unit.

The acquisition unit is configured to acquire the binocular image.

The first calculation unit is configured to calculate a gradient value of each pixel in the binocular image so as to obtain a gradient image corresponding to the binocular image, and perform a filtering operation on the gradient image.

The first determination unit is configured to perform non-maximum suppression on the gradient image after the filtering operation so as to determine the edge pixels.

The second determination unit is configured to perform a preset pixel range neighborhood search in a horizontal direction and a vertical direction on all of the edge pixels, and if the edge pixel exists in the preset pixel range neighborhood and a directly adjacent position is a non-edge pixel, set the directly adjacent position to the edge pixel so as to determine all edge pixels corresponding to the binocular image.

On the basis of the above embodiments, as a preferred implementation mode, the first calculation module includes: a calculation subunit, a first comparison subunit, and a setting subunit.

The calculation subunit is configured to calculate a gradient value of each pixel in the binocular image so as to obtain a gradient image corresponding to the binocular image.

The first comparison subunit is configured to compare each of the gradient values with all gradient values in a preset neighborhood range.

The setting subunit is configured to set a position gradient value with the same magnitude and different direction from the gradient value in the preset neighborhood range to 0.

On the basis of the above embodiments, as a preferred implementation mode, the first determination unit includes: a second comparison subunit and a determination subunit.

The second comparison subunit is configured to compare each target gradient value after the filtering operation with all gradient values in the preset neighborhood range.

The determination subunit is configured to determine that a pixel corresponding to a target gradient value which is greater than all gradient values in the preset neighborhood range is the edge pixel.

On the basis of the above embodiments, as a preferred implementation mode, the first determination module 401 includes: an acquisition unit, an extraction unit, a second calculation unit, a third determination unit, and a fourth determination unit.

The acquisition unit is configured to acquire a binocular image.

The extraction unit is configured to extract edge pixels of the binocular image.

The second calculation unit is configured to extract a feature vector of each pixel in the binocular image, and perform matching cost calculation on feature vectors of all pixels in a neighborhood window in a preset parallax search range of all of the edge pixels.

The third determination unit is configured to determine that an edge pixel of which the matching cost satisfies a preset condition is the high-confidence parallax point. Wherein, the preset condition includes that the smallest matching cost is less than a first preset value and the ratio of the smallest matching cost to the second smallest matching cost is less than a second preset value.

The fourth determination unit is configured to determine that the parallax of the smallest matching cost is the parallax of the high-confidence parallax point.

On the basis of the above embodiments, as a preferred implementation mode, the adjustment module 404 includes: a fifth determination unit, and a first adjustment unit.

The fifth determination unit is configured to determine whether the number of high-confidence parallax points is greater than a third preset value in a first preset search range for each of the edge pixels; when the number of high-confidence parallax points is greater than a third preset value in a first preset search range for each of the edge pixels, calculate statistical values of the parallax of all high-confidence parallax points in the first preset search range, the statistical values including a mean square error; and determine that an edge pixel corresponding to the statistical value greater than the third preset value is the depth boundary point.

The first adjustment unit is configured to determine a parallax boundary point of each depth boundary point in a target direction, and adjust parallax of pixels between the depth boundary point and the parallax boundary point to a target value. Wherein, the target value is a value close to a parallax value of the depth boundary point in a first parallax value and a second parallax value, the first parallax value is a parallax value of a first pixel point, the second parallax value is a parallax value of a second pixel point, the first pixel point and the second pixel point are adjacent pixel points, and the parallax boundary point is located between the first pixel point and the second pixel point.

On the basis of the above embodiments, as a preferred implementation mode, the adjustment module 404 includes: a sixth determination unit, a seventh determination unit, and a second adjustment unit.

The sixth determination unit is configured to determine a depth boundary point in the edge pixels according to distribution of the high-confidence parallax points.

The seventh determination unit is configured to perform a second preset search range search on each of the depth boundary points in the target direction, and determine a parallax difference between every two adjacent pixel points; determine that adjacent pixel points corresponding to a parallax difference greater than a fourth preset value are the first pixel point and the second pixel point; and determine that an intermediate position of the first pixel point and the second pixel point is the parallax boundary point.

The second adjustment unit is configured to adjust parallax of pixels between the depth boundary point and the parallax boundary point to a target value.

With respect to the apparatus in the above embodiments, the specific mode in which the various modules perform operations has been described in detail in the embodiments of the method, which will not be described in detail herein.

Figure 5:
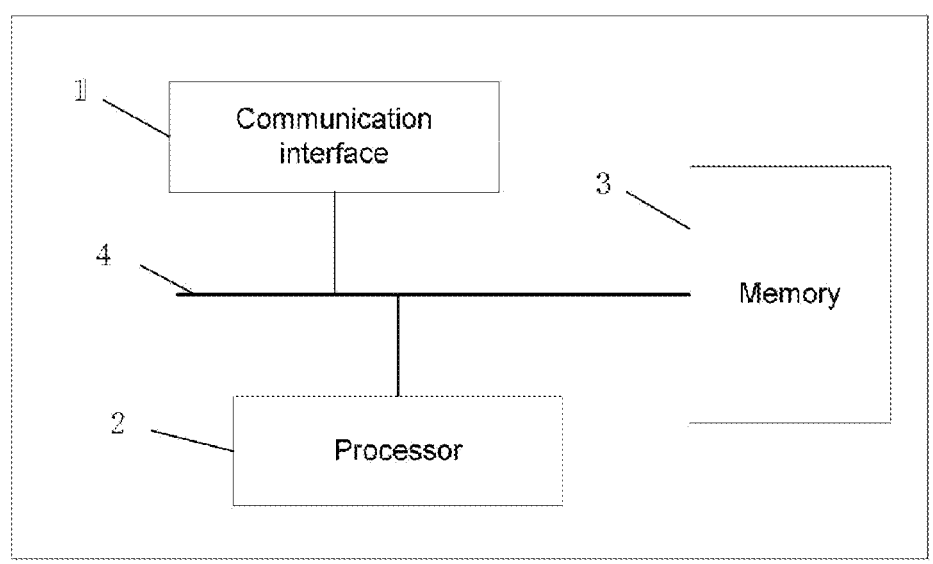
FIG. 5 is a structural diagram of the electronic apparatus shown according to an exemplary embodiment.

On the basis of hardware implementation of the above program modules, in order to implement the method in the embodiments of the present disclosure, the embodiments of the present disclosure also provide an electronic apparatus, FIG. 5 is a structural diagram of the electronic apparatus shown according to an exemplary embodiment, as shown in FIG. 5, the electronic apparatus includes: a communication interface 1 and a processor 2.

The communication interface 1 may perform information interaction with other apparatuses, such as a network apparatus, etc.

The processor 2 is connected to the communication interface 1 so as to realize information interaction with other apparatuses for executing an access method of an disclosure provided by at least one above embodiment when running a computer program. The computer program is stored on a memory 3.

Of course, in practical disclosure, various components of the electronic apparatus are coupled together through a bus system 4. It may be understood that the bus system 4 is configured to implement connection communication among these components. The bus system 4 includes a data bus and further includes a power bus, a control bus and a state signal bus. However, for clear description, various buses in FIG. 5 are marked as the bus system 4.

The memory 3 in the embodiment of the present disclosure is configured to store various type of data to support the operation of the electronic apparatus. Examples of these data include: any computer program configured to operate on the electronic apparatus.

It may be understood that the memory 3 may be a volatile memory or a nonvolatile memory, or may include both the volatile and nonvolatile memories. Wherein, the nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, a compact disc or a Compact Disc Read-Only Memory (CD-ROM). The magnetic surface memory may be a disk memory or a tape memory. The volatile memory may be a Random Access Memory (RAM), and is used as an external high-speed cache. It is exemplarily but unlimitedly described that RAMs in various forms may be adopted, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM) and a Direct Rambus Random Access Memory (DRRAM). The memory 2 described in the embodiment of the present disclosure is intended to include, but not limited to, memories of these and any other proper types.

The method disclosed in the embodiments of the present disclosure may be applied to the processor 2 or implemented by the processor 2. The processor 2 may be an integrated circuit chip and has a signal processing capability. In an implementation process, the steps of the above method may be accomplished by an integrated logic circuit of hardware in the processor 2 or an instruction in a software form. The above processor 2 may be a universal processor, a Digital Signal Processor (DSP) or another programmable logical apparatus, discrete gate or transistor logical apparatus and discrete hardware component. The processor 2 may implement or execute each method, step and logical block diagram disclosed in the embodiments of the present disclosure may be implemented or executed. The universal processor may be a microprocessor, any conventional processor or the like. The steps of the method disclosed in combination with the embodiments of the present disclosure may be directly embodied to be executed and completed by a hardware decoding processor or executed and completed by a combination of hardware and software modules in the decoding processor. The software module may be in a storage medium, and the storage medium is in the memory 3. The processor 2 reads the program in the memory 3 and completes the steps of the method in combination with hardware.

The processor 2, when executing the program, implements the corresponding processes in each method of the embodiments of the present disclosure, for brevity, it will not be repeated here.

In an exemplary embodiment, the embodiments of the present disclosure also provide a storage medium, namely, a computer storage medium, in particular a computer-readable storage medium, for example, a memory 3 storing a computer program executable by a processor 2 to complete the steps of the above method. The computer-readable memory may be a memory such as a FRAM, a ROM, a PROM, an EPROM, an EEPROM, a flash memory, a magnetic surface memory, a compact disc or a CD-ROM.

Those of ordinary skill in the art should know that all or part of the steps of the above method embodiment may be implemented by related hardware instructed through a program, the program may be stored in a computer-readable storage medium, and the program is executed to execute the steps of the above method embodiment. The storage medium includes: various media capable of storing program codes such as a mobile storage apparatus, a ROM, a RAM, a magnetic disk or a compact disc.

Or, when being implemented in form of software functional module and sold or used as an independent product, the above integrated unit of the present disclosure may also be stored in a computer-readable storage medium. Based on such an understanding, the technical solutions of the embodiments of the present disclosure substantially or parts making contributions to the conventional art may be embodied in form of software product, and the computer software product is stored in a storage medium, including multiple instructions configured to enable an electronic apparatus (which may be a personal computer, a server, a network apparatus or the like) to execute all or part of the method in each embodiment of the present disclosure. The storage medium includes: various media capable of storing program codes such as a mobile hard disk, a ROM, a RAM, a magnetic disk or a compact disc.

The above is only the specific implementation mode of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

What is claimed is:

1. An image registration method, comprising:
    acquiring a binocular image, extracting edge pixels of the binocular image, and determining high-confidence parallax points in the edge pixels of the binocular image and parallax of each of the high-confidence parallax points;
    performing triangulation on all of the high-confidence parallax points on the basis of a three-dimensional space defined by pixel coordinates in the binocular image of each of the high-confidence parallax points and the parallax of each of the high-confidence parallax points to obtain a triangular mesh, and projecting each non-high-confidence parallax point to the triangular mesh in a direction parallel with a parallax dimension to obtain a triangular face;
    determining a range defined by a greatest parallax value and a smallest parallax value of three vertices in each of the triangular faces as a parallax search range of parallax of each of the non-high-confidence parallax points, calculating a matching cost corresponding to all parallax in each of the parallax search ranges, and determining that parallax with the smallest matching cost is a parallax of the corresponding non-high-confidence parallax point of the binocular image, selecting the parallax with smallest matching cost as a parallax value of a current pixel;
    determining a depth boundary point in the edge pixels of the binocular image according to distribution of the high-confidence parallax points, determining a parallax boundary point of each depth boundary point in a target direction, and setting parallax of pixels between the depth boundary point and the parallax boundary point to a target value; wherein, the target value is a value close to a parallax value of the depth boundary point in a first parallax value and a second parallax value, the first parallax value is a parallax value of a first pixel point, the second parallax value is a parallax value of a second pixel point, the first pixel point and the second pixel point are adjacent pixel points, and the parallax boundary point is located between the first pixel point and the second pixel point;
    wherein determining the parallax boundary point of each depth boundary point in the target direction comprises:
    determining the parallax boundary point in a dense parallax result in the target direction for each depth boundary point, wherein the dense parallax result is the parallax with the smallest matching cost;
    aligning the parallax boundary point with the depth boundary point by pixel filling based on the target value; matching the binocular image with the aligned parallax boundary point.

2. The image registration method as claimed in claim 1, wherein extracting edge pixels of the binocular image comprises:
    calculating a gradient value of each pixel in the binocular image so as to obtain a gradient image corresponding to the binocular image, and performing a filtering operation on the gradient image;
    performing non-maximum suppression on the gradient image after the filtering operation so as to determine the edge pixels; and
    performing search of a preset pixel range neighborhood in a horizontal direction and a vertical direction on all of the edge pixels, and when the edge pixel exists in the preset pixel range neighborhood and a directly adjacent position is a non-edge pixel, setting the directly adjacent position to the edge pixel so as to determine all edge pixels corresponding to the binocular image.

3. The image registration method as claimed in claim 2, wherein the performing the filtering operation on the gradient image comprises:
    comparing each of the gradient values with all gradient values in a preset neighborhood range; and
    setting a position gradient value with the same magnitude and different direction from the gradient value in the preset neighborhood range to 0.

4. The image registration method as claimed in claim 2, wherein the performing non-maximum suppression on the gradient image after the filtering operation so as to determine the edge pixels comprises:
    comparing each target gradient value after the filtering operation with all gradient values in the preset neighborhood range; and
    determining that a pixel corresponding to a target gradient value which is greater than all gradient values in the preset neighborhood range is the edge pixel.

5. The image registration method as claimed in claim 1, wherein the determining a depth boundary point in the edge pixels according to distribution of the high-confidence parallax points comprises:
    determining whether a number of high-confidence parallax points is greater than a third preset value in a first preset search range for each of the edge pixels;
    when a number of high-confidence parallax points is greater than a third preset value in a first preset search range for each of the edge pixels, calculating statistical values of the parallax of all high-confidence parallax points in the first preset search range; wherein, the statistical values comprise a mean square error; and
    determining that an edge pixel corresponding to the statistical value greater than the third preset value is the depth boundary point.

6. The image registration method as claimed in claims 1, wherein the determining the parallax boundary point of each depth boundary point in the target direction comprises:
    performing a second preset search range search on each of the depth boundary points in the target direction, and determining a parallax difference between every two adjacent pixel points;
    determining that adjacent pixel points corresponding to a parallax difference greater than a fourth preset value are the first pixel point and the second pixel point; and determining that an intermediate position of the first pixel point and the second pixel point is the parallax boundary point.

7. An electronic apparatus, comprising:
a memory, configured to store a computer program; and
a processor, configured to execute the computer program to:
acquire a binocular image, extracting edge pixels of the binocular image, and determine high-confidence parallax points in the edge pixels of the binocular image and parallax of each of the high-confidence parallax points;
perform triangulation on all of the high-confidence parallax points on the basis of a three-dimensional space defined by pixel coordinates in the binocular image of each of the high-confidence parallax points and the parallax of each of the high-confidence parallax points to obtain a triangular mesh, and project each non-high-confidence parallax point to the triangular mesh in a direction parallel with a parallax dimension to obtain a triangular face;
determine a range defined by a greatest parallax value and a smallest parallax value of three vertices in each of the triangular faces as a parallax search range of parallax of each of the non-high-confidence parallax points, calculate a matching cost corresponding to all parallax in each of the parallax search ranges, and determine that parallax with the smallest matching cost is a parallax of the corresponding non-high-confidence parallax point of the binocular image, select the parallax with smallest matching cost as a parallax value of a current pixel;
determine a depth boundary point in the edge pixels of the binocular image according to distribution of the high-confidence parallax points, determine a parallax boundary point of each depth boundary point in a target direction, and setting parallax of pixels between the depth boundary point and the parallax boundary point to a target value; wherein, the target value is a value close to a parallax value of the depth boundary point in a first parallax value and a second parallax value, the first parallax value is a parallax value of a first pixel point, the second parallax value is a parallax value of a second pixel point, the first pixel point and the second pixel point are adjacent pixel points, and the parallax boundary point is located between the first pixel point and the second pixel point;
wherein determine the parallax boundary point of each depth boundary point in the target direction comprises:
determine the parallax boundary point in a dense parallax result in the target direction for each depth boundary point, wherein the dense parallax result is the parallax with the smallest matching cost;
align the parallax boundary point with the depth boundary point by pixel filling based on the target value; match the binocular image with the aligned parallax boundary point.

8. A non-transitory storage medium, wherein a computer program is stored on the non-transitory storage medium, and when executed by a processor, cause the processor to:
acquire a binocular image, extracting edge pixels of the binocular image, and determine high-confidence parallax points in the edge pixels of the binocular image and parallax of each of the high-confidence parallax points;
perform triangulation on all of the high-confidence parallax points on the basis of a three-dimensional space defined by pixel coordinates in the binocular image of each of the high-confidence parallax points and the parallax of each of the high-confidence parallax points to obtain a triangular mesh, and project each non-high-confidence parallax point to the triangular mesh in a direction parallel with a parallax dimension to obtain a triangular face;
determine a range defined by a greatest parallax value and a smallest parallax value of three vertices in each of the triangular faces as a parallax search range of parallax of each of the non-high-confidence parallax points, calculate a matching cost corresponding to all parallax in each of the parallax search ranges, and determine that parallax with the smallest matching cost is a parallax of the corresponding non-high-confidence parallax point of the binocular image, select the parallax with smallest matching cost as a parallax value of a current pixel;
determine a depth boundary point in the edge pixels of the binocular image according to distribution of the high-confidence parallax points, determine a parallax boundary point of each depth boundary point in a target direction, and setting parallax of pixels between the depth boundary point and the parallax boundary point to a target value; wherein, the target value is a value close to a parallax value of the depth boundary point in a first parallax value and a second parallax value, the first parallax value is a parallax value of a first pixel point, the second parallax value is a parallax value of a second pixel point, the first pixel point and the second pixel point are adjacent pixel points, and the parallax boundary point is located between the first pixel point and the second pixel point;
wherein determine the parallax boundary point of each depth boundary point in the target direction comprises:
determine the parallax boundary point in the dense parallax result in the target direction for each depth boundary point, wherein the dense parallax result is the parallax with the smallest matching cost;
align the parallax boundary point with the depth boundary point by pixel filling based on the target value; match the binocular image with the aligned parallax boundary point.

9. The image registration method as claimed in claim 1, wherein calculating a matching cost corresponding to all parallax in each of the parallax search ranges comprises:
calculating the matching costs corresponding to all parallax in the parallax search range according to a calculation process of a local matching algorithm.

10. The image registration method as claimed in claim 6, wherein the target direction includes a horizontal positive direction, a horizontal negative direction, a vertical positive direction, and a vertical negative direction.

11. The image registration method as claimed in claim 5, wherein the statistical values comprise a difference between the greatest parallax and the smallest parallax of all high-confidence parallax points in the first preset search range.

12. The image registration method as claimed in claim 10, wherein when the target direction is the horizontal direction, determining the parallax boundary point of each depth boundary point in the target direction comprises:
performing the second preset search range search on each of the depth boundary points in the horizontal positive direction, and determining a parallax difference between every two adjacent pixel points;
when an absolute value of the parallax difference between two adjacent pixel points is greater than the fourth preset value, considering an intermediate position between the two adjacent pixel points as the parallax boundary point; and when the absolute value of the parallax difference between two adjacent pixel points is not greater than the fourth preset value, performing the second preset search range search on each of the depth boundary points in the horizontal negative direction.

13. The electronic apparatus as claimed in claim 7, the processor is further configured to execute the computer program to:
    calculate a gradient value of each pixel in the binocular image so as to obtain a gradient image corresponding to the binocular image, and perform a filtering operation on the gradient image;
    perform non-maximum suppression on the gradient image after the filtering operation so as to determine the edge pixels; and
    perform search of a preset pixel range neighborhood in a horizontal direction and a vertical direction on all of the edge pixels, and when the edge pixel exists in the preset pixel range neighborhood and a directly adjacent position is a non-edge pixel, set the directly adjacent position to the edge pixel so as to determine all edge pixels corresponding to the binocular image.

14. The electronic apparatus as claimed in claim 13, the processor is further configured to execute the computer program to:
    compare each of the gradient values with all gradient values in a preset neighborhood range;
    set a position gradient value with the same magnitude and different direction from the gradient value in the preset neighborhood range to 0.

15. The electronic apparatus as claimed in claim 13, the processor is further configured to execute the computer program to:
    compare each target gradient value after the filtering operation with all gradient values in the preset neighborhood range; and
    determine that a pixel corresponding to a target gradient value which is greater than all gradient values in the preset neighborhood range is the edge pixel.

16. The electronic apparatus as claimed in claim 7, the processor is further configured to execute the computer program to:
    determine whether a number of high-confidence parallax points is greater than a third preset value in a first preset search range for each of the edge pixels;
    when a number of high-confidence parallax points is greater than a third preset value in a first preset search range for each of the edge pixels, calculate statistical values of the parallax of all high-confidence parallax points in the first preset search range; wherein, the statistical values comprise a mean square error; and
    determine that an edge pixel corresponding to the statistical value greater than the third preset value is the depth boundary point.

\* \* \* \* \*